United States Patent
Johnson

(10) Patent No.: US 10,320,929 B1
(45) Date of Patent: Jun. 11, 2019

(54) OFFLOAD PIPELINE FOR DATA MIRRORING OR DATA STRIPING FOR A SERVER

(71) Applicant: Amazon Technologies, Inc., Seattle, WA (US)

(72) Inventor: Robert Michael Johnson, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 332 days.

(21) Appl. No.: 14/748,131

(22) Filed: Jun. 23, 2015

(51) Int. Cl.
  *G06F 15/167* (2006.01)
  *H04L 29/08* (2006.01)

(52) U.S. Cl.
  CPC ...... *H04L 67/2814* (2013.01); *H04L 67/1095* (2013.01); *H04L 67/2842* (2013.01)

(58) Field of Classification Search
  None
  See application file for complete search history.

(56) References Cited

U.S. PATENT DOCUMENTS

| | | | |
|---|---|---|---|
| 7,171,484 B1 | 1/2007 | Krause et al. | |
| 10,001,933 B1 | 6/2018 | Johnson | |
| 2002/0133620 A1 | 9/2002 | Krause | |
| 2003/0195983 A1 | 10/2003 | Krause | |
| 2003/0236851 A1* | 12/2003 | Cuddihy | H04L 67/1095 709/214 |
| 2005/0256972 A1* | 11/2005 | Cochran | G06F 11/2071 709/245 |
| 2007/0005833 A1* | 1/2007 | Seto | G06F 13/385 710/52 |
| 2011/0219208 A1 | 9/2011 | Asaad et al. | |
| 2012/0317390 A1 | 12/2012 | Bickelman et al. | |
| 2013/0232378 A1* | 9/2013 | Resch | G06F 21/64 714/6.24 |
| 2013/0339600 A1* | 12/2013 | Shah | G06F 3/067 711/114 |
| 2014/0007189 A1* | 1/2014 | Huynh | G06F 3/0622 726/3 |
| 2014/0115228 A1 | 4/2014 | Zhou et al. | |
| 2014/0189380 A1* | 7/2014 | Colpo | G06F 3/0614 713/300 |
| 2014/0244866 A1 | 8/2014 | Manula et al. | |
| 2015/0381491 A1* | 12/2015 | Graham | H04L 45/58 370/392 |

OTHER PUBLICATIONS

U.S. Appl. No. 14/673,466, filed Mar. 30, 2015, Titled: Offload Pipeline for Data Mirroring.
U.S. Appl. No. 14/748,133, filed Jun. 23, 2015, Titled: Offload Pipeline for Data Copying.

* cited by examiner

*Primary Examiner* — Phyllis A Book
(74) *Attorney, Agent, or Firm* — Kilpatrick Townsend & Stockton LLP

(57) ABSTRACT

A server computer comprising an Input/Output (I/O) adapter device and a host device receives I/O requests for transactions from a client computer via a network. According to various embodiments, the host device can offload certain data processing for storing payload data for the transactions to the I/O adapter device. The I/O adapter device can perform data mirroring or data striping on the payload data and can send the mirrored or striped data for storing in the plurality of storage volumes. The plurality of storage volumes can include one or more remote storage volumes and/or one or more local storage volumes.

20 Claims, 7 Drawing Sheets

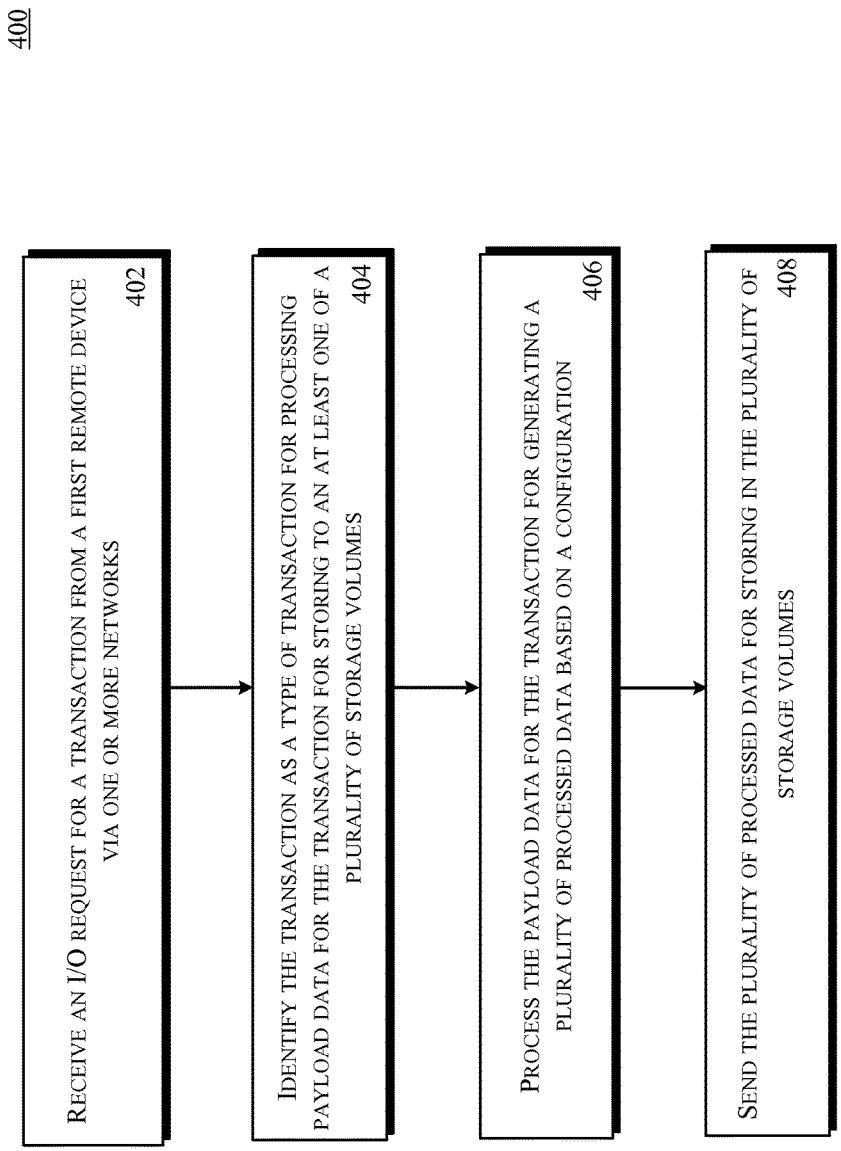

US 10,320,929 B1

OFFLOAD PIPELINE FOR DATA MIRRORING OR DATA STRIPING FOR A SERVER

BACKGROUND

Server computers often receive input/output (I/O) requests from client computers. For example, a server computer may provide a multi-tenant platform to multiple clients. The server computer may provide services such as storage, archive, databases, etc. to different clients. In some instances, a client computer may send an I/O request to a server computer over a communication network for storing data in a storage device. Server computers often include one or more input/output (I/O) devices. For example, a server computer may include one or more I/O adapter devices for communicating with the storage devices.

In some instances, server computers may process payload data for the I/O requests for storing in the storage devices. For example, in one instance, a host device in a server computer may perform data mirroring to generate multiple copies of the payload data to have high availability of the data. In another instance, the host device may perform data striping on the payload data to generate multiple segments (or stripes) of the data for faster retrieval of the data. The host device may send the multiple copies or segments of the data over a Peripheral Component Interconnect Express (PCIe) interface to an I/O adapter device for storing in a storage device. Sending each copy or segment of the data over the PCIe bus to the I/O adapter device may not only consume lot of bandwidth between the host device and the I/O adapter device but may also slow down the performance of the host device for other important tasks.

BRIEF DESCRIPTION OF THE DRAWINGS

Various embodiments in accordance with the present disclosure will be described with reference to the drawings, in which:

FIG. 4 illustrates an exemplary method for processing the payload data by a server computer, according to some embodiments of the disclosed technology.

DETAILED DESCRIPTION

Figure 1:
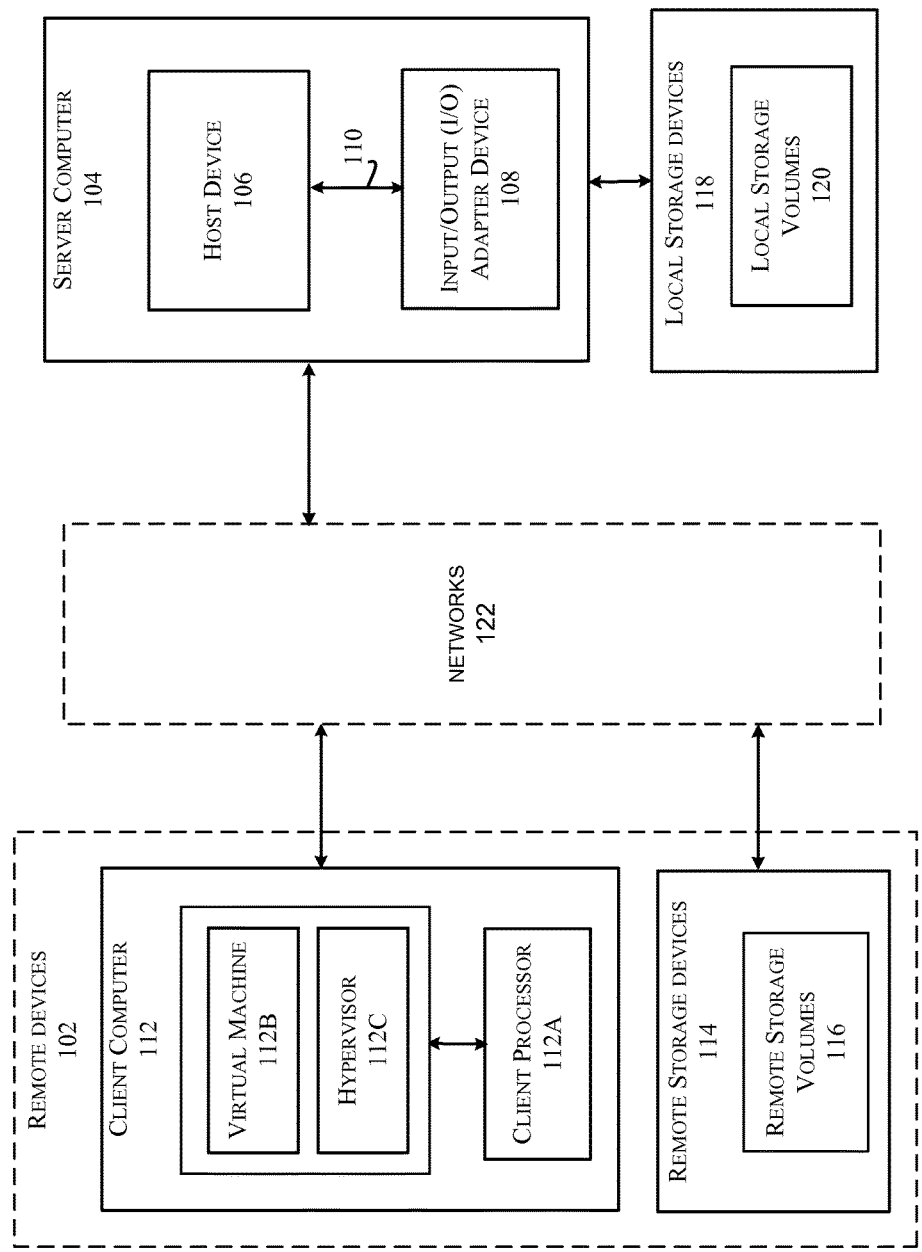
FIG. 1 illustrates a system comprising a server computer in communication with a plurality of remote devices via one or more networks, according to one embodiment of the technology.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Typically, a server computer may perform data mirroring on payload data for an I/O request for storing multiple copies of the payload data in different storage volumes to avoid a single point of failure. For example, the I/O requests may be received by the server computer over a network from a client computer. In some instances, the server computer may perform data striping to split the payload data into multiple segments for storing the multiple segments of the payload data in different storage volumes for higher throughput. In some instances, the server computer may include a host device and an I/O device. Typically, the host device may perform data mirroring or data striping on the payload data and send each copy or segment of the data to the I/O device over a host interface such as a PCIe interface for storing in different storage volumes. However, sending multiple copies or segments of the data by the host device over the host interface can consume lot of bandwidth and affect the performance of the host device for other important tasks, thus resulting in decreased throughput of the system.

Various embodiments of the disclosed technologies can allow a host device in a server computer to offload certain data processing tasks to an I/O adapter device for I/O requests received from a remote device. For example, a server computer may receive an I/O request over a network from a client computer for storing data in a storage volume. The storage volume may reside in a local storage device coupled to the server computer or in a remote storage device communicatively coupled to the server computer via the network. In some instances, the server computer may perform data mirroring to store redundant copies of the data in multiple storage volumes to increase its availability in the event of a failure or to decrease response time. In some instances, the server computer may perform data striping to split the payload data into multiple segments for storing in multiple storage volumes to improve the data throughput, e.g., faster write and read accesses of the stored data. According to various embodiments of the disclosed technologies, the host device may offload data processing operations associated with the storage of the data to the I/O adapter device. This may allow improved bandwidth utilization of the host interface and also the memory bandwidth for the host device since the data mirroring and/or data striping operations can be performed by the I/O adapter device with minimum access to the host processor or to the host memory, which can help free up the host device resources for other important tasks.

In some embodiments, the I/O adapter device may intercept an I/O request for a transaction transmitted by the client computer for writing to a storage volume. The I/O adapter device may identify the transaction as a type of transaction for processing payload data for the transaction for storing in an at least one of a plurality of storage volumes. For example, the I/O adapter device may perform data mirroring or data striping on the payload data for fault tolerance, higher throughput, high availability of the data or for any suitable criteria. In one embodiment, the I/O adapter device may be configured to perform data mirroring to generate one or more copies of the payload data for storing in the plurality of storage volumes based on a mirroring configuration. In another embodiment, the I/O adapter device may be configured to perform data striping by splitting the payload data into multiple segments or parts for storing in the plurality of storage volumes based on a striping configuration. In some embodiments, the I/O adapter device can generate one or more error correction codes corresponding to the one or more segments of the payload data for storing in the one or more storage volumes. For example, the one or more error correction codes may be used for error detection and correction of the stored data. In some embodiments, the mirroring or the striping configuration may be provided by the host device or determined by the I/O adapter device. In various embodiments of the disclosed technologies, different copies or segments of the payload data and the error correction codes may be stored in one or more local storage volumes and/or one or more remote storage volumes. For example, in some embodiments, the one or more local storage volumes may be associated with a local memory or a storage device coupled to the server computer. In some embodiments, the one or more remote storage volumes may be associated with one or more remote storage devices. For example, the I/O adapter device may be communicatively coupled to the one or more remote storage devices via one or more networks.

Various embodiments of the disclosed technologies can minimize traversing the host interface between the host device and the I/O adapter device by offloading the processing of the payload data to the I/O adapter device for performing data mirroring or data striping for storing in a plurality of storage volumes. The plurality of storage volumes may include one or more local storage volumes and/or one or more remote storage volumes. This may allow for more headroom for other processing by the host device, can improve utilization of resources on the host device and can reduce cost which can result in lower costs for the end users.

FIG. 1 illustrates a system 100 comprising a server computer 104 in communication with a plurality of remote devices 102 via one or more networks 122. In one embodiment, the plurality of remote devices 102 may include a client computer 112 and one or more remote storage devices 114. The one or more remote storage devices 114 can include one or more remote storage volumes 116. The server computer 104 may include a host device 106 and an I/O adapter device 108 coupled via a host interface 110. The server computer 104 may also be coupled to one or more local storage devices 118 that may include one or more local storage volumes 120. Generally, the server computer may receive an I/O request from a first remote device (e.g., a client computer) via a network for a transaction to store payload data for the transaction in a storage volume. The host device may offload processing of the payload data to the I/O adapter device. The I/O adapter device may perform data mirroring to generate one or more copies of the payload data or data striping to generate one or more segments of the payload data. The I/O adapter device may further send the processed data (e.g., copies or segments of the payload data) for storing in the one or more remote storage volumes via the network and/or the one or more local storage volumes. By offloading some of the data processing to the I/O adapter device can minimize the usage of the host device resources thus increasing the throughput of the system.

In some instances, the server computer 104 may be coupled to one or more client computers via the one or more networks 122. The server computer 104 may be a high performance computer that can support more complex data processing as compared to the client computer 112. In some instances, the server computer 104 may provide different services to the client computer 112, e.g., data processing, data storage, network storage, network processing, archive, data analysis, web services, etc. In some embodiments, one or more virtual machines running different applications on the client computer 112 may use the services provided by the server computer 104.

The client computer 112 may include a client processor 112A that may be configured to execute a plurality of instructions. For example, the instructions may be stored in a computer readable medium (not shown) that may be residing on the client computer 112 or be coupled to the client computer 112. The client computer 112 may be configured to execute one or more virtual machines, e.g., a virtual machine 112B. The virtual machine 112B may be any suitable emulation of a computer system that may be managed by a hypervisor 112C. The hypervisor 112C may be configured to manage the virtual machine 112B, for example, to create, start, monitor, stop or to delete the virtual machine 112B. The hypervisor 112C may be implemented as a piece of compute software, firmware or hardware.

In some instances, the client computer 112 may transmit data to one or more network destinations via the one or more networks 122. For example, the one or more network destinations may include different server nodes, e.g., the server computer 104. In some instances, each of the network destinations may be coupled to one or more storage devices, e.g., hard discs, solid state drives (SSDs), compact discs, magnetic tapes, USB portable drives, etc. In some embodiments, each of the storage devices may include one or more storage volumes. In some instances, one or more of the network destinations may be part of a Storage Area Network (SAN). For example, in one embodiment, the virtual machine 112B may transmit an I/O request for storing data in a virtual block storage device that may be emulated by one or more storage volumes associated with the server computer 104. For example, in one embodiment, the virtual machine 112B may execute a data mirroring application on the client computer 112 for a database, e.g., Oracle DB®, MongoDB®, etc., and may send the I/O request for storing the mirrored data to the server computer 104 via the one or more networks 122. In another embodiment, the virtual machine 112B may execute a data striping application on the client computer 112 and may send the I/O request for storing a segment or strip of the data to the server computer 104 via the one or more networks 122.

The server computer 104 may provide a multi-tenant platform to multiple clients. The server computer 104 may provide services such as cloud computing, cloud storage, archive, analytics, web services, databases, applications, deployment services, website hosting, etc. to different clients. In some embodiments, the server computer 104 may include a host device 106 and an I/O adapter device 108. The host device 106 may be configured to offload data processing for I/O requests received from a remote device via the one or more networks 122 to the I/O adapter device 108. The host device 106 may communicate with the I/O adapter device 108 via a host interface 110. For example, the host interface 110 may be a standard interface, e.g., a PCIe interface. In some embodiments, the I/O adapter device 108 may be configured to perform network services for the host device 106, e.g., network traffic monitoring, network storage, network processing, etc. Some non-limiting examples of the I/O adapter device 108 may include plug-in modules, expansion cards or any such electronic circuits, e.g., network interface controllers, video cards, sound cards, USB (Universal Serial Bus) devices, Wi-Fi devices, etc.

The server computer 104 may be configured to receive the I/O request from a remote device via the one or more networks 122. In some instances, the networks 122 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. It will be understood that different remote devices 102 may communicate with the server computer 104 via same or different networks.

In some embodiments, the server computer 104 may receive an I/O request for a transaction from the client computer 112 for writing to a storage volume associated with the server computer 104. For example, the storage volume may be part of the local storage volumes 120 or the remote storage volumes 116. In one embodiment, the server computer 104 may identify the transaction as a type of transaction for processing payload data for the transaction for storing to an at least one of a plurality of storage volumes. According to different embodiments, the host device 106 may offload data processing to be performed by the I/O adapter device 108, e.g., data processing or data striping, for storing payload data in the one or more remote storage volumes 116 and/or the local storage volumes 120. In accordance with some embodiments, the I/O adapter device 108 may perform data mirroring to generate one or more copies of the payload data for storing in the plurality of storage volumes for high availability of the data. In another embodiment, the I/O adapter device 108 may perform data striping to generate one or more segments of the data for storing in the plurality of storage volumes for faster recovery of the data. In some embodiments, the I/O adapter device 108 may generate one or more error correction codes corresponding to the one or more segments of the data and may store the one or more error correction codes in one or more storage devices.

In some embodiments, a storage volume may include a single accessible storage area, e.g., partition of a hard disc, single storage device, logical drive or removable storage device. In some embodiments, one or more storage volumes can span one or more storage devices. It will be understood that the number of storage volumes can be different or same for each of the storage devices.

The local storage devices 118 may include one or more local storage devices that may be internal or external to the server computer 104. In some embodiments, at least one of the plurality of storage volumes for storing processed data can reside in the one or more local storage devices. Some non-limiting examples of the local storage devices 118 may include SSDs (Solid State Drives), compact discs, USB portable drives, SATA (Serial Advanced Technology Attachment) drives, e.g., hard disc drives, optical drives, etc. In some embodiments, each local storage device 118 may include one or more local storage volumes 120. In some embodiments, one or more local storage volumes 120 can span one or more local storage devices 118. It will be understood that the number of local storage volumes 120 can be different or same for each of the local storage devices 118.

In some instances, the one or more local storage devices 118 may provide faster access time as compared to the one or more remote storage devices 114. In some embodiments, the one or more local storage devices 118 may be coupled to the I/O adapter device 108 using one or more interfaces, e.g., PCIe interface, SATA interface or any suitable interface.

The one or more remote storage volumes 116 may be part of the one or more remote storage devices 114 that may be communicatively coupled to the server computer 104 via the one or more networks 112. In some embodiments, each remote device 114 may include one or more remote storage volumes 116. In some embodiments, one or more remote storage volumes 116 can span one or more remote devices 114. In some embodiments, at least one of the plurality of storage volumes for storing processed data can reside in the one or more remote storage devices. It will be understood that the number of remote storage volumes 116 can be different or same for each of the remote devices 114. In some instances, the one or more remote devices 114 may provide higher storage capacity as compared to the one or more local storage devices 118. Some non-limiting examples of the remote devices 114 may include hard discs, SSDs, magnetic tapes, etc. The one or more remote storage devices 114 may communicate with the server computer 104 using the same or different networks 122. For example, a first remote storage device may communicate with the server computer 104 using an Ethernet connection and a second remote storage device may communicate with the server computer 104 using a fiber channel.

In some embodiments, the server computer 104 may receive an I/O request for a transaction from the client computer 112 to store the payload data in a storage volume associated with the server computer 104. For example, the storage volume may be part of the local storage volumes 120 or the remote storage volumes 116. In one embodiment, the host device 106 may receive the I/O request for the transaction from the client computer 112. The host device 106 may offload processing of at least a portion or the entire I/O request to the I/O adapter device 108. For example, in some embodiments, the host device 106 may offload data processing for the transaction to the I/O adapter device 108. The I/O adapter device 108 may perform data processing (e.g., data mirroring or data striping) on the payload data for the transaction as configured by the host device 106. In another embodiment, the I/O adapter device 108 may be configured to intercept the I/O request from the client computer 112 and to perform data processing on the payload data for the transaction for storing in a plurality of storage volumes.

In some embodiments, the I/O adapter device 108 may perform data mirroring based on a mirroring configuration to store copies of the same data in multiple storage volumes. For example, data mirroring may be performed to store redundant copies of the data in different storage volumes to avoid a single point of failure, to increase its availability in the event of a failure or to decrease response time. In some embodiments, the mirroring configuration may be provided by the host device 106, an external entity or determined by the I/O adapter device 108. In some embodiments, the mirroring configuration may provide number of copies for data mirroring, and addresses for the volumes or the storage devices (e.g., logical block addresses) where the processed data may be stored. In some embodiments, redundant copies of the data may be stored in different storage devices, e.g., different physical devices and/or at different physical locations. For example, in some embodiments, one or more copies of the payload data may be stored in the local storage devices 118 and/or one or more copies of the payload data may be stored in the remote storage devices 114. In some embodiments, for faster recovery of the payload data, a copy of the payload data stored in the local storage device 118 can be accessed. Data mirroring can provide speedy recovery of the data, e.g., if one destination is down, the data may be accessed from another destination. For example, in some instances, if the local storage device 118 is down, a copy of the payload data may be recovered from the remote storage device 114. Similarly, if the remote storage device 114 is down or the network 122 is down, a copy of the payload data can be recovered from the local storage device 118. In some embodiments, one or more copies of the payload data may be stored in the remote storage device 114 since the local storage devices 118 may have limited storage capacity.

In some embodiments, the I/O adapter device 108 may perform data striping to split the payload data into multiple segments (or blocks) based on a striping configuration for storing in multiple storage volumes. Data striping may be performed to provide increased throughput for data accesses, e.g., segments of data can be retrieved in parallel from different storage locations, thus increasing system performance. In some embodiments, the striping configuration may be provided by the host device 106, an external entity or determined by the I/O adapter device 108. In some embodiments, the striping configuration may provide a strip width (e.g., block size), number of segments (or blocks) for data striping, and the addresses for the volumes or the storage devices where the processed data may be stored. In some embodiments, the I/O adapter device 108 may also generate error correction codes (ECC) corresponding to one or more segments for storing in the multiple storage volumes. For example, the error correction codes can allow detection of any inconsistencies between the data stored and the data read from the storage volumes in the event of data corruption or data loss and accordingly can perform the error correction in order to recover the payload data. Some non-limiting examples of the error correction codes may include parity, hamming code, etc. In some embodiments, an ECC flag may indicate if error correction codes may be calculated and stored for data striping operations. In one embodiment, one or more ECC configuration bits may indicate a configuration for storing the error correction codes. For example, in one embodiment, the multiple segments and the corresponding error correction codes may be stored in the local storage devices 118 for faster access times or in the remote storage devices 114 for higher storage capacity. In one embodiment, the multiple segments of the payload data and the error correction codes corresponding to the multiple segments may be stored in different storage devices. In another embodiment, one or more segments of the payload data and the corresponding error correction codes may be stored in a dedicated storage device. Data striping may allow accessing the stored data segments concurrently from multiple storage volumes, thus improving the I/O performance. In some instances, data striping can be used to balance the I/O load across an array of storage disks.

Figure 2:
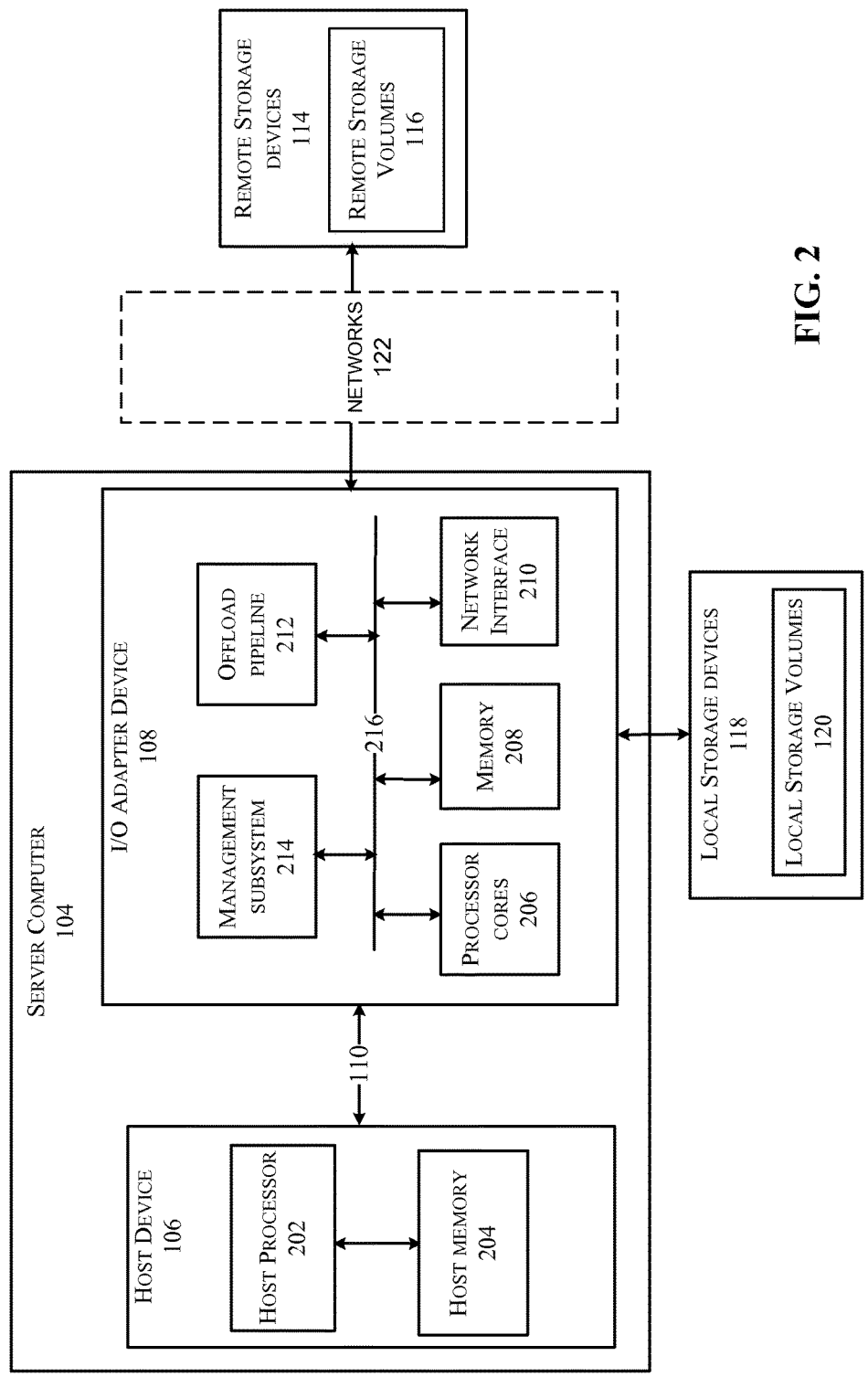
FIG. 2 illustrates a server computer comprising a host device and an I/O adapter device for performing on-chip data mirroring and data striping using an offload pipeline, according to one embodiment of the technology.

FIG. 2 illustrates a block diagram of a server computer comprising a host device and an I/O adapter device for performing on-chip data mirroring and data striping using an offload pipeline, according to one embodiment of the technology. A system 200 can include the server computer 104 communicatively coupled to the remote storage devices 114 via the one or more networks 122 and to the local storage devices 118. Generally, the server computer receives an I/O request from a client computer via a network and the host device can offload processing of payload data for the I/O request to the I/O adapter device. An offload pipeline in the I/O adapter device can process the payload data for data mirroring and/or data striping operations. The processed data can then be stored in the one or more remote storage volumes via the one or more networks or in the one or more local storage volumes. This may allow improved bandwidth utilization of the host interface and also the memory bandwidth for the host device since the data mirroring and/or data striping operations can be performed by the I/O adapter device with minimum access to the host processor or to the host memory.

The host device 106 may include a host processor 202 that may be coupled to a host memory 204. In some embodiments, the host processor 202 may include an x86 processor or any suitable processors or processor cores. The host processor 202 may be configured to execute a plurality of instructions that may be stored in a computer readable medium. The instructions may be stored on a computer-readable storage medium, for example, in the form of a computer program. The computer-readable storage medium may be non-transitory. In some instances, the computer readable medium may be part of the host memory 204. The host memory 204 may be internal or external to the host device 106. For example, the host memory 204 may be a RAM, ROM, Electrically Erasable Programmable Read-Only Memory (EEPROM), flash memory or any suitable storage media.

The host device 106 may be configured to receive I/O requests from the client computer 112 via the networks 122. In one embodiment, an I/O request may include a transaction for storing payload data in a storage volume associated with the server computer 104. For example, in one embodiment, the host processor 202 may receive an interrupt for an I/O request received from the client computer 112. In one embodiment, the I/O request may be initiated by the virtual machine 112B running a database application on the client computer 112 and the I/O request may include writing to a virtual storage volume. In one embodiment, the I/O request may include a header with the payload data for the transaction. For example, the header may include information about a source address, a volume identifier, a destination storage address, a block size, etc. and any other relevant information. The source address may represent an address for the client computer 112 or the virtual machine 112B, e.g., a MAC (Media Access Control) address. The volume identifier may represent an identifier for the destination storage volume for storing the payload data. The destination storage address may represent an address for the destination storage volume or the storage device for storing the payload data, e.g., logical block address (LBA). The block size may represent size of the block for writing to the storage volume. In some embodiments, the header may include a read/write control to indicate that the transaction includes a write or read access of the storage volume. According to some embodiments of the disclosed technologies, the host device may offload processing of at least a portion or the entire I/O request to the I/O adapter device 108. For example, the host device 106 may offload processing and storage functionalities of the payload data to the I/O adapter device 108. For example, the host device 106 may configure the I/O adapter device 108 to perform data mirroring or data striping on the payload data for the I/O request. For example, in some embodiments, the host device 106 may include a first PCIe controller (not shown) that can communicate the information associated with the I/O request to a second PCIe controller (not shown) on the I/O adapter device 108 via the host interface 110. In some embodiments, the host processor 202 may configure the I/O adapter device 108 with the appropriate mirroring or striping configuration to enable the I/O adapter device 108 for performing data mirroring or data striping for the I/O request appropriately. This may free up the host device 106 resources for other important tasks.

In one embodiment, the host device 106 may configure the I/O adapter device 108 to perform data mirroring or data striping by configuring one or more bits in certain registers in the I/O adapter device 108. For example, in one embodiment, the I/O adapter device 108 may intercept the I/O request received from the client computer 112 via the networks 122 and may perform data mirroring or data striping on the payload data associated with the I/O request based on a mirroring or striping configuration respectively. In one embodiment, the I/O adapter device 108 may be configured at the boot time to perform data mirroring or data striping on the payload data streaming from the client computer 112. In some embodiments, the mirroring or striping configuration may be determined based on protocol specific information associated with the I/O request, type of the remote device 102 (e.g., virtual machine 112B) sending the I/O request, the block storage device or the storage volume represented by the volume identifier, or any other suitable criteria. In some embodiments, the I/O adapter device 108 may be configured by an external entity.

The I/O adapter device 108 may include processor cores 206, a memory 208, a network interface 210, an offload pipeline 212 and a management subsystem 214. Different components of the I/O adapter device 104 may be configured to communicate with one another using an interconnect 216. For example, the interconnect 216 may include busses, mesh, matrix, fabric or any suitable implementation to allow various components of the I/O adapter device 108 to communicate with one another. It will be understood that the I/O adapter device 108 may include more or less components than shown in FIG. 2. For example, the I/O adapter device 108 may also include one or more memory controllers, I/O controllers, etc.

The processor cores 206 may be configured to execute a plurality of instructions on one or more processors of the processor cores 206. Some non-limiting examples of the processor cores 206 may include ARM's cortex A57, MIPS, AMD Phenom, Intel ATOM, etc. The instructions may be stored on a computer-readable storage medium, for example, in the form of a computer program. The computer-readable storage medium may be non-transitory. In some instances, the computer readable medium may be part of the memory 208. The memory 208 may be internal or external to the I/O adapter device 108. For example, the memory 208 may be a RAM, ROM, Electrically Erasable Programmable Read-Only Memory (EEPROM), flash memory or any suitable storage media. In some embodiments, the processor cores 206 may share certain resources, such as busses and Level 1 (L1) caches and/or Level 2 (L2) caches between each of the processor cores.

In one embodiment, the I/O adapter device 108 may intercept an I/O request for a transaction received from the client computer 112, e.g., via the networks 122. The I/O request may include payload data for the transaction for writing to a block storage device. For example, the client computer 112 may send an I/O request for writing to a storage volume associated with the server computer 104 emulated as a block storage device. In one embodiment, the I/O adapter device 108 may be configured to process the I/O request as configured by the host processor 202. For example, the host processor 202 may configure the I/O adapter device 108 with the appropriate mirroring or striping configuration to enable the offload pipeline 212 for performing data mirroring or data striping for the I/O request appropriately. For example, in some embodiments, the mirroring or striping configuration may provide the information about the plurality of storage volumes for storing the mirrored or striped data with/without the error correction codes, number of copies or segments for storage, strip width, etc. In one embodiment, the I/O adapter device 108 may perform the write transaction to the target block storage device and also perform data mirroring or data striping on the payload data for the transaction for storing in the plurality of storage volumes.

In one embodiment, the management subsystem 214 may be configured to configure and manage the offload pipeline 212. In some embodiments, the management subsystem 214 may be configured to determine whether the I/O adapter device 108 may perform data mirroring or data striping for an I/O request based on a configuration, e.g., one or more bits in a certain configuration register. In some embodiments, the one or more bits in the configuration register may be configured to enable data mirroring and/or data striping by the I/O adapter device 108 for I/O requests received from a specific remote device (e.g., the client computer 112 or the virtual machine 112B). In some embodiments, the one or more bits in the configuration register may be configured to enable data mirroring and/or data striping by the I/O adapter device 108 for I/O requests targeted to a particular storage device, e.g., based on the volume identifier associated with the I/O request. The one or more bits in the configuration register may be programmed by the host device 106, by the BIOS software or configured by an external entity. In one embodiment, the mirroring or striping configuration can be determined by the I/O adapter device 108. For example, the management subsystem 214 may determine the mirroring or a striping configuration for performing data mirroring or data striping by the offload pipeline 212 if the I/O adapter device 108 is configured to perform data mirroring or striping. In one embodiment, the mirroring configuration may include volume identifiers for different storage volumes for storing the one or more copies of the payload data, number of copies to be stored, address for each storage volume or storage device for storing the one or more copies of the payload data and any other relevant information. The striping configuration may include volume identifiers for different storage volumes for storing multiple segments of the data and the corresponding error correction codes, number of segments to be stored, strip width, address for each storage volume and storage device for storing each segment and the corresponding error correction codes, ECC flag, ECC configuration, and any other relevant information. Different storage volumes may include one or more local storage volumes and/or one or more remote storage volumes.

In some embodiments, the management subsystem 214 may determine different storage volumes to provide corresponding volume identifiers in the mirroring or striping configurations for storing the processed data by the offload pipeline 212 based on a plurality of criteria. For example, in one embodiment, the processed data that may be used frequently or may be timing critical can be stored in the one or more local storage volumes 120 for faster retrieval of the data. In one embodiment, the processed data that may not be used frequently can be stored in the one or more remote storage volumes 116. In one embodiment, a portion of the processed data may be stored in the local storage volumes 120 and the remaining processed data may be stored in the remote storage volumes 116. For example, for data mirroring, one or more copies of the payload data may be stored in the local storage devices 118 and the one or more copies of the payload data may be stored in the remote storage devices 114. This may allow a faster retrieval of the payload data from the local storage devices 118 in the event when the network is down or slow. In some embodiments, the remote storage devices 114 may provide more data storage capacity as compared to the local storage devices 118. For example, the local storage devices may be limited in size or may store other data not related to data mirroring or data striping. In some embodiments, the management subsystem 214 may provide the address for each storage volume and storage device for storing a copy or segment of the payload data. In some embodiments, volume identifiers and the addresses corresponding to different storage volumes for the mirroring or striping configuration may be provided by the host device 106 or by an external entity.

In some embodiments, the management subsystem 214 may determine the number of copies for providing in the mirroring configuration for data mirroring based on the remote device 102 (e.g., the virtual machine 112B) sending the I/O request, the destination storage volume associated with the volume identifier specified in the I/O request for storing the payload data, type of the I/O request (e.g., network storage or network processing), size of the payload data (e.g. block size) or any suitable criteria. In some embodiments, the number of copies may be provided by the host device 106 or by an external entity. In one embodiment, the payload data received with the I/O request may be stored in the storage volume associated with the volume identifier received with the I/O request and one or more copies of the payload data generated by the offload pipeline 212 may be stored in the storage volumes determined by the management subsystem 214, the host device 106 or by an external entity as discussed above.

In some embodiments, the management subsystem 214 may determine the number of segments and the strip width for providing in the striping configuration for data striping based on the remote device 102 (e.g., virtual machine 112B) sending the I/O request, the storage volume associated with the volume identifier specified in the I/O request for storing the payload data, type of the I/O request (e.g., network storage or network processing), size of the payload data or any suitable criteria. In some embodiments, the number of segments, strip width, ECC flag, ECC configuration and any other relevant information for the striping configuration may be provided by the host device 106 or by an external entity.

The network interface 210 may include any suitable interface to enable the I/O adapter device 108 to communicate with the plurality of remote devices 102 via the networks 122. For example, the I/O adapter device 108 may communicate with the one or more remote storage devices 114 to store the processed data (e.g., copies or segments of the payload data) in the one or more remote storage volumes 116 via the one or more networks 122. In some embodiments, the network interface 210 may allow the communication between the client computer 112 and the host device 106 or the I/O adapter device 108. For example, the client computer 112 may send an I/O request via the networks 122 for writing to an emulated storage device associated with the server computer 104 that may be intercepted by the network interface 210. In some embodiments, the networks 122 may include one or more networks that may be based on different protocols such as the Internet Protocol (IP), Ethernet, Wi-Fi, Transmission Control Protocol (TCP), User Datagram Protocol (UDP), Asynchronous Transfer Mode (ATM), token ring, frame relay, High Level Data Link Control (HDLC), Fiber Distributed Data Interface (FDDI), Point-to-Point Protocol (PPP), etc. For example, in one instance, the network interface 210 may include a physical Ethernet port. It will be understood that in some instances, the networks 122 may include multiple networks and different remote storage devices 114 may use or share one or more networks of the networks 122. For example, a first remote storage device and a second remote storage device may share a first network (e.g., an Ethernet network) for data transfer and a third remote storage device may use a second network (e.g., a Wi-Fi network) for data transfer.

The offload pipeline 212 may include a plurality of components that may be configured to process I/O request for a transaction from a remote device, e.g., the client computer 112, via a network. In one embodiment, the offload pipeline 212 may be configured to perform data processing for the I/O requests as configured by the host device 106. For example, the host device 106 may have offloaded the data processing for the I/O request to the I/O adapter device 108 by configuring the I/O adapter device 108 to perform appropriate data processing. The offload pipeline 212 may be configured to identify that the transaction is a type of transaction for processing payload data for the transaction for storing to a plurality of storage volumes. The offload pipeline 212 may also be configured to process the payload data for generating a plurality of processed data based on a configuration. For example, the offload pipeline 212 may perform data mirroring for generating one or more copies of the payload data based on a mirroring configuration for storing in the plurality of storage volumes. The offload pipeline 212 may perform data striping for generating two or more segments of the payload data based on a striping configuration for storing in the plurality of storage volumes. The offload pipeline 212 may further send the processed data for storing in the plurality of storage volumes. For example, the plurality of storage volumes may reside in the one or more remote storage devices 114 and/or the one or more local storage devices 118. In some embodiments, the offload pipeline 212 may also generate one or more error correction codes corresponding to the one or more segments of the payload data for storing in the plurality of storage volumes. An exemplary block diagram of the offload pipeline 212 is discussed with reference to FIG. 3.

Figure 3:
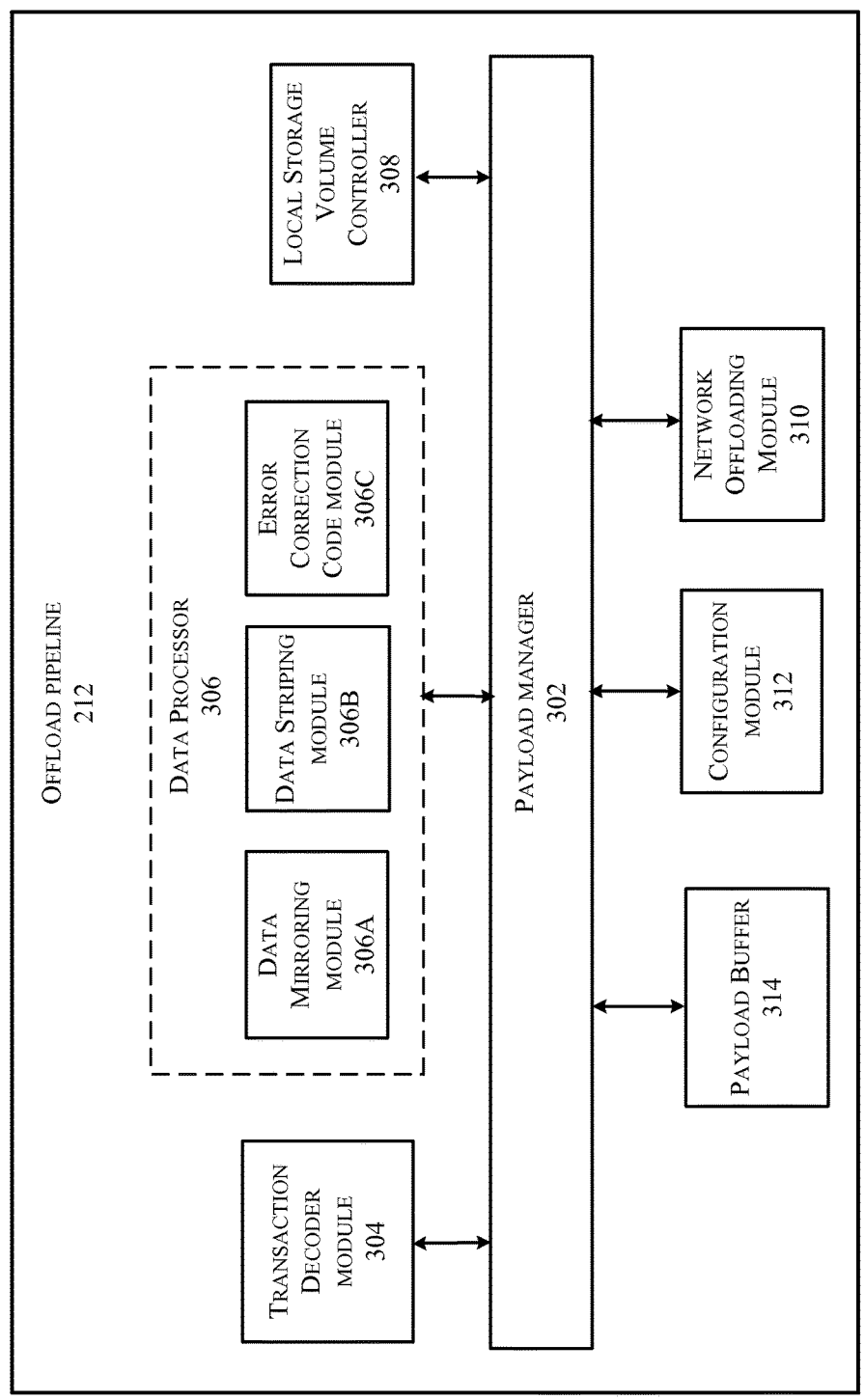
FIG. 3 illustrates components of the offload pipeline in accordance with one embodiment of the disclosed technology.

FIG. 3 illustrates components of an offload pipeline in accordance with one embodiment of the disclosed technology.

The offload pipeline 212 may include a payload manager 302, a transaction decoder module 304, a data processor 306, a local storage volume controller 308, a network offloading module 310, a configuration module 312 and a payload buffer 314. The data processor 306 may include a data mirroring module 306A, a data striping module 306B and an error correction code module 306C.

The transaction decoder module 304 may be configured to decode the transaction requests received by the I/O adapter device 108. For example, the I/O requests sent from a remote device may be received by the network interface 210 via the networks 122. In one embodiment, the transaction decoder module 304 may be configured to communicate with the network interface 210 to intercept the I/O requests received from the client computer 112. In some embodiments, the transaction decoder module 304 may include one or more queues for handling I/O requests from different remote devices. For example, in one embodiment, the one or more queues may be assigned to each of the processor cores 206 for handling specific type of I/O requests from specific remote devices. In one embodiment, the transaction decoder module 304 may include a PCIe bus interface to communicate with the host device 106. For example, the transaction decoder module 304 may include a PCIe controller that may be configured to communicate with another PCIe controller on the host device 106 over a PCIe interface, e.g., the host interface 110.

In one embodiment, the transaction decoder module 304 may identify that the transaction includes writing to a storage volume based on the volume identifier, source address, destination address, block size and the read/write control information included in the one or more bits in the header received with the payload data for that transaction. The transaction decoder module 304 may further identify the transaction as a type of transaction for processing payload data for the transaction for storing to a plurality of storage volumes. For example, the transaction decoder module 304 may identify the type of the transaction based on one or more bits in a configuration register. In one embodiment, the one or more bits in the configuration register may be configured to enable the I/O adapter device 108 for performing data mirroring or data striping on the payload data streaming from the client computer 112 based on the protocol specific information associated with the I/O request, type of the remote device 102 (e.g., virtual machine 112B or client computer 112) sending the I/O request, the destination storage device or the storage volume represented by the volume identifier, type of the I/O request (e.g., network storage or network processing) or any other suitable criteria.

The configuration module 312 may include one or more configuration registers that can be used to configure the I/O adapter device 108. In some embodiments, the one or more configuration registers can be configured by the host device 106, an external entity or by BIOS software (e.g., at power up or boot time). In one embodiment, the host device 106 may access certain bits of the configuration register to determine some of the capabilities of the I/O adapter device 108, e.g., data mirroring, data striping, etc. for offloading certain functionalities to the I/O adapter device 108. In some embodiments, the host device 106 can configure the I/O adapter device 108 for processing the payload data for storing in the plurality of storage volumes by configuring certain bits in the configuration register. For example, in some embodiments, one or more bits in the configuration register may be programmed to configure the I/O adapter device 108 to perform data mirroring, data striping, ECC generation or a combination thereof. In some embodiments, the I/O adapter device 108 may be configured to perform data mirroring to generate one or more copies of the payload data for storing in the plurality of storage volumes for high availability of the data. In another embodiment, the I/O adapter device 108 may be configured to perform data striping to generate one or more segments of the data for storing in the plurality of storage volumes for faster recovery of the data. In one embodiment, a plurality of bits in a configuration register may be used to represent a mirroring configuration or a striping configuration. For example, the mirroring configuration and the striping configuration may be determined by the management subsystem 214 as discussed earlier or provided by the host device 106 or by an external entity.

The data processor 306 may be configured to perform data mirroring, data striping or any suitable data processing to process the payload data for storing in the one or more storage volumes. In one embodiment, the data processor 306 may decompress and decrypt the payload data before processing the payload data. For example, the payload data received from the client computer 112 may be compressed and encrypted for efficient and secure transmission over the networks 122. The data processor 306 may be configured to process the payload data to generate a plurality of processed data, e.g., a first processed data, a second processed data, a third processed data, etc. for storing in the one or more storage volumes. For example, in one embodiment, the first processed data may be stored in a first local storage volume in a first local storage device, the second processed data may be stored in a first remote storage volume in a first remote storage device via a first network, and the third processed data may be stored in a second remote storage volume in a second remote storage device via a second network, and so on. In another embodiment, the first processed data and the second processed data may be stored in a first remote storage volume in a first remote storage device via a first network, and the third processed data may be stored in a second remote storage volume in a second remote storage device via the first network. In one embodiment, the data processor 306 may compress and encrypt the processed data for storing in the plurality of storage volumes. In some embodiments, the data processor 306 may include a data mirroring module 306A, a data striping module 306B and an error correction code (ECC) module 306C.

The data mirroring module 306A may be configured to perform data mirroring on the payload data based on the mirroring configuration. For example, the mirroring configuration may include number of copies, volume identifiers for destination storage volumes, addresses for destination storage volumes, etc. The data mirroring module 306A may be configured to generate one or more copies of the payload data for storing in the plurality of storage volumes. For example, in one embodiment, the first processed data may be the payload data itself and the second processed data may be a copy of the payload data. In some embodiments, the payload data may be stored in the payload buffer 314 via the payload manager 302 to generate multiple copies for storing in the plurality of storage volumes. The one or more copies may be sent for storing in the one or more storage volumes based on the mirroring configuration. For example, one or more copies for storing in the local storage devices 118 may be sent via the local storage volume controller 308 and the one or more copies for storing in the remote storage devices 114 using the networks 122 may be sent via the network offloading module 310.

Figure 5A:
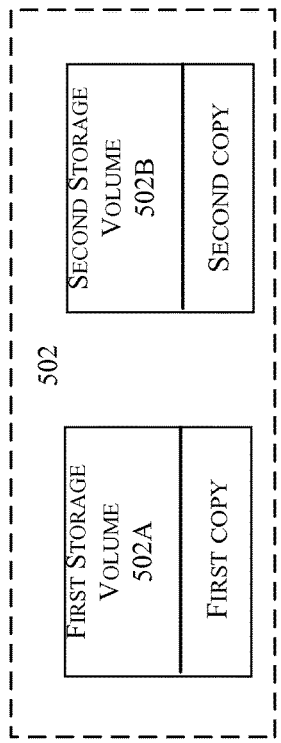
FIG. 5A illustrates plurality of storage volumes for a data mirroring configuration, according to some embodiments of the disclosed technology.

FIG. 5A illustrates a plurality of storage volumes 502 for storing a first copy and a second copy of the payload data in one embodiment of the technology. As illustrated in the figure, the first copy of the payload data may be stored in a first storage volume 502A and the second copy of the payload data may be stored in a second storage volume 502B. In one embodiment, the first copy or the second copy may be the payload data itself (e.g., the payload data received with the I/O request or stored in the payload buffer 314). The first storage volume 502A and the second storage volume 502B may reside in the local storage devices 118 and/or the remote storage devices 114. For example, in one embodiment, the first storage volume 502A may reside in a first remote storage device of the remote storage devices 114 and the second storage volume 502B may reside in a second remote storage device of the remote storage devices 114. In one embodiment, the first storage volume 502A may reside in a first local storage device of the local storage devices 118 and the second storage volume 502A may reside in a first remote storage device of the remote storage devices 114.

Referring back to FIG. 3, the data striping module 306B may be configured to perform data striping on the payload data based on a striping configuration. For example, the striping configuration may include number of segments (also called stripes, strip units, strides, blocks, etc.), strip width, volume identifiers for destination storage volumes, addresses of destination storage volumes, ECC flag, ECC configuration, etc. The data striping module 306B may be configured to split the payload data into multiple segments or parts for efficient storage and faster retrieval of the payload data. For example, the first processed data may be a first segment of the payload data and the second processed data may be a second segment of the payload data. Different segments of the payload data may be stored in the one or more storage volumes. In one embodiment, the payload data may be split into logically sequential segments for storing the consecutive segments in different storage volumes. According to some embodiments, the data striping module 306B may split the payload data into bits, bytes, words or blocks of any suitable size. In some embodiments, error correction codes (e.g. parity, checksum, hamming codes, cyclic redundancy check, etc.) associated with different segments may also be stored to perform error detection and correction in case of data corruption (e.g., failure of a storage device). The error correction codes may be generated by the error correction code module 306C as described further. In some embodiments, the payload data may be stored in the payload buffer 314 to generate multiple segments for storing in the plurality of storage volumes.

The error correction code module 306C may be configured to generate one or more error correction codes for the one or more segments of the payload data generated by the data striping module 306B. In one embodiment, the error correction code module 306C may generate one or more error correction codes for the one or more segments if the ECC is enabled in the striping configuration, e.g., the ECC flag is set. In one embodiment, one or more error correction codes for the one or more segments of the payload data may be sent for storing in a dedicated local storage device or a remote storage device. For example, a first segment of the payload data may be stored in a first remote device, a second segment of the payload data may be stored in a second remote device and the error correction codes corresponding to the first and second segments may be stored in a third remote device or a local storage device. In another embodiment, error correction codes may be distributed to different local storage devices or remote storage devices where different segments of the payload data may be stored. For example, a first segment of the payload data and a respective error correction code may be stored in a first remote or local storage device and a second segment of the payload data and a respective error correction code may be stored in a second remote or local storage device. This configuration may allow better recovery of the data in case one of the storage devices fails as compared to having a dedicated storage device for storing the error correction codes. It will be noted that error correction codes can be generated and stored using any suitable method known in the art, e.g., RAID 5 or RAID 6. For example, in some embodiments, error corrections codes and/or segments of the payload data can be stored in a round robin fashion among the plurality of the storage volumes. In some embodiments, redundant error correction codes may be stored in multiple storage volumes. In some embodiments, the error correction codes may be generated based on the redundancy and performance requirement associated with the I/O request. In some embodiments, the ECC data may be generated and stored based on the value of ECC configuration from the striping configuration. For example, FIGS. 5B and 5C illustrate different configurations for storing the ECC data corresponding to one or more segments of the payload data, in some embodiments of the technology.

Figure 5B:
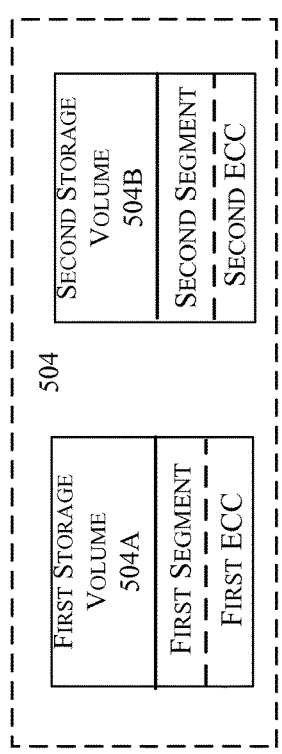
FIG. 5B illustrates plurality of storage volumes for a data striping configuration with a distributed ECC configuration, according to some embodiments of the disclosed technology.

FIG. 5B illustrates a plurality of storage volumes 504 for storing a first segment and a second segment of the payload data with a corresponding first ECC and a second ECC, in one embodiment of the technology. As illustrated in the figure, the first segment of the payload data and the first ECC may be stored in a first storage volume 504A and the second segment of the payload data and the second ECC may be stored in a second storage volume 504B. The first storage volume 504A and the second storage volume 504B may reside in the local storage devices 118 and/or the remote storage devices 114. For example, in one embodiment, the first storage volume 504A may reside in a first remote storage device of the remote storage devices 114 and the second storage volume 504B may reside in a second remote storage device of the remote storage devices 114. In one embodiment, the first storage volume 504A may reside in a first local storage device of the local storage devices 118 and the second storage volume 5OBA may reside in a first remote storage device of the remote storage devices 114.

Figure 5C:
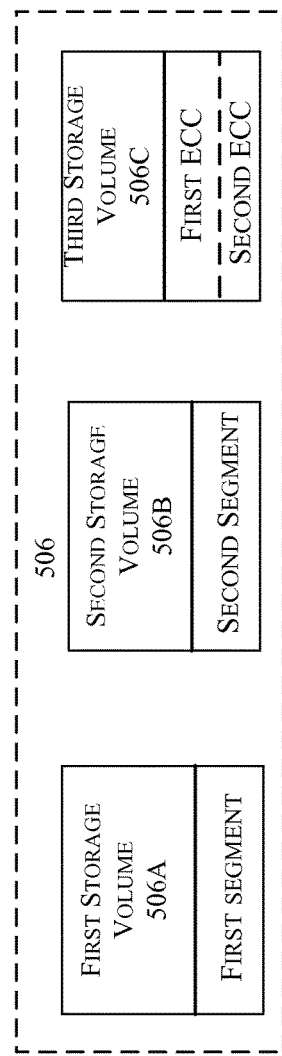
FIG. 5C illustrates plurality of storage volumes for a data striping configuration with a dedicated ECC configuration, according to some embodiments of the disclosed technology.

FIG. 5C illustrates a plurality of storage volumes 506 for storing a first segment and a second segment of the payload data with the corresponding first ECC and the second ECC, in one embodiment of the technology. As illustrated in the figure, the first segment of the payload data may be stored in a first storage volume 506A and the second segment of the payload data may be stored in a second storage volume 506B. The first ECC corresponding to the first segment and the second ECC corresponding to the second segment may be stored in a third storage volume 506C. The first storage volume 506A, second storage volume 506B and the third storage volume 506C may reside in the local storage devices 118 and/or the remote storage devices 114. For example, in one embodiment, the first storage volume 506A may reside in a first remote storage device of the remote storage devices 114, second storage volume 506B may reside in a second remote storage device of the remote storage devices 114 and the third storage volume 506C may reside in a third remote storage device of the remote storage devices 114. In one embodiment, the first storage volume 506A may reside in a first local storage device of the local storage devices 118, second storage volume 506B may reside in a second local storage device of the local storage devices 118 and the third storage volume 506C may reside in a first remote storage device of the remote storage devices 114. In some instances, the configuration in FIG. 5B may provide better error detection and correction if one of the storage device fails as compared to the configuration in FIG. 5C. For example, if the first storage volume 506A and the third storage volume 506 fail or are corrupted, the first ECC and the second ECC may not be available for error correction.

Referring back to FIG. 3, the payload buffer 314 may include an on-chip memory to store the data. In some embodiments, the payload buffer 314 may include a memory that can provide fast access time for writing and reading the payload data, e.g., an SRAM (Static Random Access Memory). In some embodiments, storing and retrieving the payload data from the payload buffer 314 may be managed by the payload manager 302. In one embodiment, the payload buffer 314 may be used to store the payload data for processing by the data processor 308. For example, one or more copies of the payload data from the payload buffer 314 may be read for storing to the plurality of storage volumes. In some embodiments, the payload buffer 314 may be configured to store multiple segments of the payload data and the corresponding error correction codes before sending them out for storing at the plurality of storage volumes.

The payload manager 302 may be configured to manage storage and retrieval of the payload data from the payload buffer 314. In some embodiments, the payload manager 302 may be configured to manage the payload data based on the mirroring or striping configuration. For example, in one embodiment, the payload manager 302 may be configured to receive the decoded payload data from the transaction decoder module 304 and to store the decoded payload data into the payload buffer 314. The payload manager 302 may also be configured to read the decoded payload data from the payload buffer 314 and to provide it to the data processor 306 for data mirroring, data striping or ECC generation. The payload manager 302 may also be configured to store multiple segments of the payload data in the payload buffer 314 as a result of the data striping performed by the data striping module 306B. In one embodiment, the payload manager 302 may also be configured to communicate with the management subsystem 214 to determine that the data mirroring and/or data striping operations may be performed on a particular payload data. In some embodiments, the payload manager 302 may be configured to provide copies or segments of the payload data from the payload buffer 314 to the local storage volume controller 308 and/or the network offloading module 310 for storing in the one or more local storage devices 118 and/or the remote storage devices 114 respectively.

The local storage volume controller 308 may be configured to control the access to the one or more local storage volumes 120 associated with the one or more local storage devices 118. For example, the local storage volume controller 308 may allow the data processor 306 to store the plurality of processed data in the one or more local storage volumes 120. In one embodiment, the local storage volume controller 308 may include a PCIe controller for accessing the one or more local storage devices 118 via a PCIe interface. In another embodiment, the local storage volume controller 308 may include a SATA controller for accessing the one or more local SATA devices 118 via a SATA interface.

The network offloading module 310 may be configured to prepare the plurality of processed data for transmitting to the one or more remote storage devices 114 for storing in the one or more remote storage volumes 116 via the one or more networks 122. For example, the network offloading module 310 may communicate with the network interface 210 for sending the plurality of processed data to the one or more remote storage volumes 114 via the networks 122. In one embodiment, the network offloading module 310 may encrypt the processed data for secure transmission of the data over the networks 122. In some embodiments, each processed data may be transmitted to the respective remote storage volume in the form of a packet. For example, a first packet may include a first packet header with a first processed data for a first remote storage volume and a second packet may include a second packet header with a second processed data for a second remote storage volume. In one embodiment, each packet header may include network protocol information (e.g., TCP/IP, UDP, etc.), source address, destination address, remote storage volume start address, block size and any other relevant data. For example, in one embodiment, the source address may correspond to the MAC address of the I/O adapter device 108 and the destination address may correspond to the MAC address of the remote storage device. The remote storage volume start address may correspond to the start address of the storage volume for the respective remote device and the block size may correspond to the size of the storage block. For data mirroring operations, the size of the storage block may be same as the size of the payload data. For data striping operations, the size of the storage block may be same as the particular segment of the payload data. It will be understood that multiple copies or segments (with error correction codes) of the payload data may be transmitted to the plurality of local storage volumes 120 or the remote storage volumes 116 sequentially, in parallel or a combination thereof.

FIG. 4 illustrates an exemplary method 400 for processing the payload data for sending to multiple network destinations, according to some embodiments of the technology.

In step 402, an I/O request is received for a transaction from a first remote device via one or more networks. For example, referring back to FIG. 1, the server computer 104 may receive an I/O request for a transaction from the client computer 112 via the networks 122. For example, the client computer 112 may be running a database application such as Oracle®, MongoDB®, etc. The virtual machine 112B running on the client computer 112 may send an I/O request for a write transaction to a virtual block storage volume. For example, the virtual block storage volume may be one of the emulated local storage volumes 120 or the remote storage volumes 116 associated with the server computer 104. As discussed with reference to FIG. 2, in one embodiment, the host device 106 may receive the I/O request via the networks 122 and may send the request to the I/O adapter device 108 for processing at least a portion of the I/O request or the entire I/O request. For example, in accordance with some embodiments of the disclosed technologies, the host device 106 may offload processing of the payload data for the transaction to the I/O adapter device 108. In some embodiments, the host device 106 may configure the I/O adapter device 108 to perform data mirroring or data striping (with or without error correction codes) on the payload data. For example, one or more bits in the configuration register may be configured by the host device 106, by an external entity, at power up or by the BIOS software to configure the I/O adapter device 108 for performing appropriate data processing for storage. In another embodiment, the I/O request received via the networks 122 may be intercepted by the I/O adapter device 108. For example, the network interface 210 may receive the I/O request via the networks 122 and may communicate the transaction details to the transaction decoder module 304 for processing by the offload pipeline 212.

In step 404, the transaction is identified as a type of transaction for processing payload data for the transaction for storing to a plurality of storage volumes. As discussed above, the I/O adapter device 108 may receive the I/O request for the transaction from the host device 106 or by intercepting the I/O request from the network interface 210. In one embodiment, the I/O adapter device 108 may first determine that the transaction is for storing payload data in a local or remote storage volume based on one or more bits in a header included in the I/O request along with the payload data, e.g., a volume identifier, LBA, read/write control and any other relevant information. In one embodiment, the I/O adapter device can determine that the transaction is the type of transaction for processing payload data for storing to the plurality of storage volumes based on one or more bits in the configuration register. For example, in one embodiment, the one or more bits in the configuration register may be configured to enable the I/O adapter device 108 for performing data mirroring or data striping on the payload data for a transaction based on the protocol specific information associated with the I/O request, type of the remote device 102 (e.g., virtual machine 112B or client computer 112) sending the I/O request, the destination storage device or the storage volume represented by the volume identifier, type of the I/O request (e.g., network storage or network processing) or any other suitable criteria. In some embodiments, the I/O adapter device 108 may be pre-configured by the host device 106 to perform data mirroring and/or data striping on the payload data for I/O requests received from a specific remote device (e.g., the client computer 112 or the virtual machine 112B). In some embodiments, the I/O adapter device 202 may be pre-configured by the host device 106 to perform data mirroring and/or data striping on the payload data for I/O requests targeted to a particular storage device.

In step 406, the I/O adapter device can process the payload data for generating a plurality of processed data based on a configuration. As discussed above, the I/O adapter device 108 may determine the type of data processing, e.g., data mirroring and/or data striping, based on one or more bits in the configuration register as discussed with reference to the configuration module 312 in FIG. 3. The I/O adapter device 108 may perform data mirroring and/or data striping on the payload data for generating the plurality of processed data for storing in the plurality of storage volumes based on a mirroring and/or striping configuration. In one embodiment, the payload data may be stored in the payload buffer 314 before the data mirroring or data striping can be performed. The payload manager 302 may retrieve the payload data from the payload buffer 314 and forward it to the data processor 306 for data mirroring and/or data striping operations. The data mirroring module 306A, data striping module 306B and the error correction code module 306C may process the data accordingly for generating the plurality of processed data. For example, in one embodiment, the data mirroring module 306A can process the payload data for generating one or more copies of the payload data based on the mirroring configuration. In one embodiment, the data striping module 306B can process the payload data for generating two or more segments of the payload data based on the striping configuration. In one embodiment, the error correction code module 306C can generate one or more error correction codes corresponding to the one or more segments for storing in the plurality of storage volumes based on the ECC configuration. For example, the data mirroring module 306A or the data striping module 306B may generate a first processed data, a second processed data and so on. The first processed data may be the payload data itself, a first copy of the payload data or a first segment of the payload data. The second processed data may be the payload data itself, a second copy of the payload data or a second segment of the payload data. In some embodiments, the plurality of processed data may include one or more error correction codes generated by the error correction code module 306C corresponding to the one or more segments of the payload data.

In step 410, the I/O adapter device can send the plurality of processed data for storing in the plurality of storage volumes. In some embodiments, the plurality of storage volumes may be determined by the corresponding mirroring or striping configuration as discussed with reference to FIG. 3. For example, the plurality of storage volumes may include one or more local storage volumes 120 and/or the one or more remote storage volumes 116. Referring back to FIG. 3, the local storage volume controller 308 may send the multiple copies or the multiple segments (with the corresponding error correction codes) of the payload data to the one or more local storage devices 118 for storing in the one or more local storage volumes 120. In one embodiment, the I/O adapter device 108 may transmit the first processed data with a first packet header in a first packet to the first remote storage volume via the networks 122 and transmit the second processed data with a second packet header in a second packet to a second remote storage volume via the networks 122, and so on. For example, the network offloading module 310 may prepare different packets including multiple copies or the multiple segments of the payload data with the appropriate headers including corresponding error correction codes for the multiple segments and offload them for storing in the one or more remote storage volumes 116 via the networks 122.

In accordance with various embodiments of the disclosed technologies, a server computer can offload processing of the payload data for I/O transactions received via a network from remote devices to an I/O adapter device. An offload pipeline in the I/O adapter device can perform data mirroring or data striping to generate a plurality of processed data for storing in a plurality of storage volumes. The plurality of storage volumes may include one or more remote storage volumes communicatively coupled to the server computer via the network and/or the one or more local storage volumes. This may allow for more headroom for other processing by the host device, can improve utilization of resources on the host device and can reduce cost which can result in lower costs for the end users.

Figure 6:
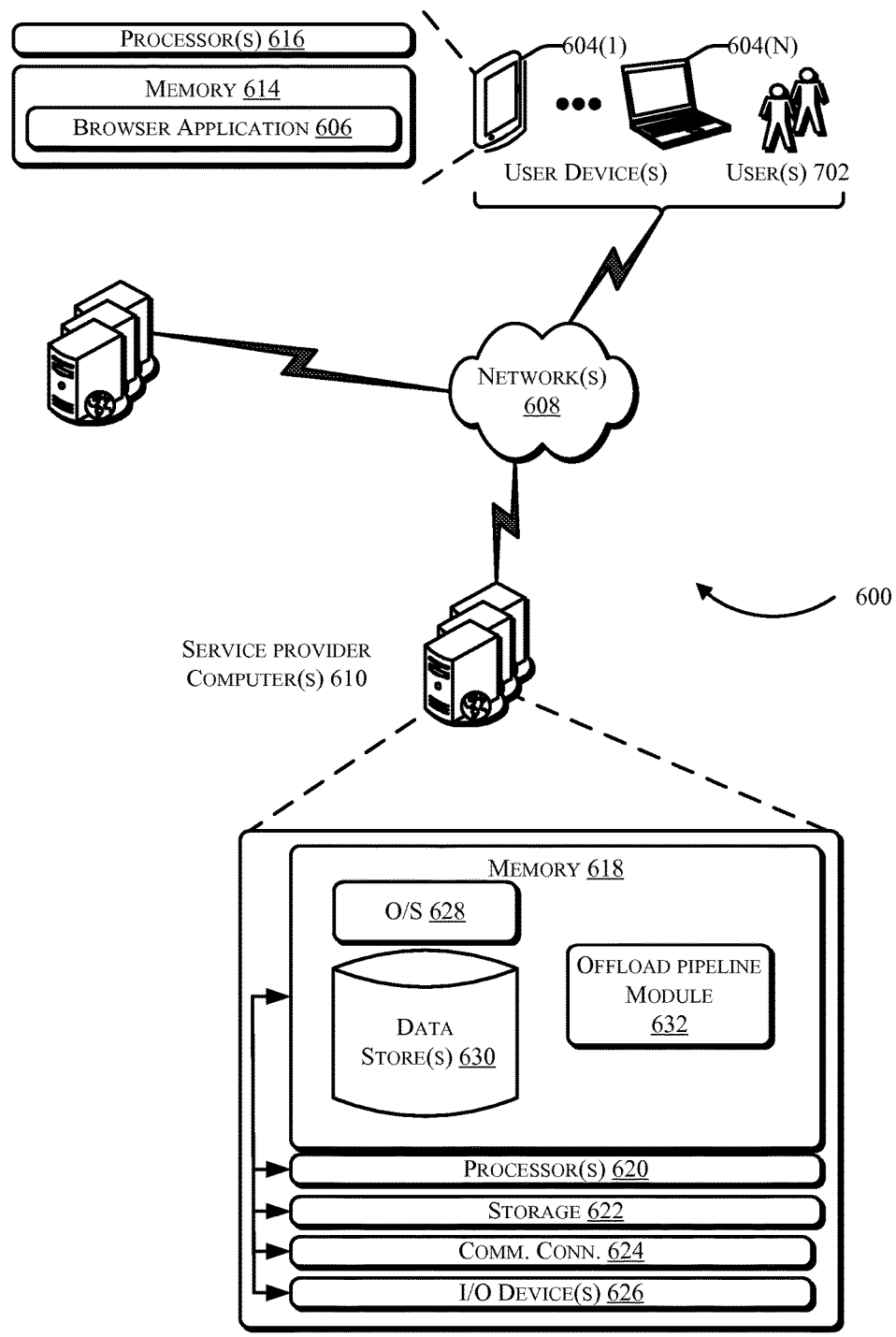
FIG. 6 illustrates an exemplary architecture for features and systems described herein that includes one or more service provider computers and/or a user device connected via one or more networks, according to at least one exemplary embodiment.

FIG. 6 illustrates an exemplary architecture for features and systems described herein that includes one or more service provider computers and/or a user device connected via one or more networks, according to at least one exemplary embodiment. The devices discussed in FIGS. 1-3, may use one or more components of the computing devices described in FIG. 6 or may represent one or more computing devices described in FIG. 6. In architecture 600, one or more users 602 may utilize user computing devices 604(1)-(N) (collectively, user devices 604) to access application 606 (e.g., a web browser or mobile device application), via one or more networks 608. In some aspects, application 606 may be hosted, managed and/or provided by a computing resources service or service provider. One or more service provider computers 610 may provide a native application which is configured to run on user devices 604 which user(s) 602 may interact with. Service provider computer(s) 610 may, in some examples, provide computing resources such as, but not limited to, client entities, low latency data storage, durable data storage, data access, management, virtualization, cloud-based software solutions, electronic content performance management, etc. Service provider computer(s) 610 may also be operable to provide web hosting, computer application development and/or implementation platforms, combinations of the foregoing or the like to user(s) 602. Service provider computer(s) 610, in some examples, may communicate with one or more third party computers 612.

In some examples, network(s) 608 may include any one or a combination of many different types of networks, such as cable networks, the Internet, wireless networks, cellular networks and other private and/or public networks. While the illustrated example represents user(s) 602 accessing application 606 over network(s) 608, the described techniques may equally apply in instances where user(s) 602 interact with service provider computer(s) 610 via user device(s) 604 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 606 may allow user(s) 602 to interact with service provider computer(s) 610 such as to access web content (e.g., web pages, music, video, etc.). Service provider computer(s) 610, perhaps arranged in a cluster of servers or as a server farm, may host application 606 and/or cloud-based software services. Other server architectures may also be used to host application 606. Application 606 may be capable of handling requests from many users 602 and serving, in response, various item web pages. Application 606 can provide any type of website that supports user interaction, including social networking sites, online retailers, informational sites, blog sites, search engine sites, news and entertainment sites and so forth. As discussed above, the described techniques can similarly be implemented outside of application 606, such as with other applications running on user device(s) 1404.

User device(s) 604 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 604 may be in communication with service provider computer(s) 610 via network(s) 608, or via other network connections. Additionally, user device(s) 604 may be part of the distributed system managed by, controlled by or otherwise part of service provider computer(s) 610 (e.g., a console device integrated with service provider computers 610).

In one illustrative configuration, user device(s) 604 may include at least one memory 614 and one or more processing units (or processor(s)) 616. Processor(s) 616 may be implemented as appropriate in hardware, computer-executable instructions, firmware, or combinations thereof. Computer-executable instruction or firmware implementations of processor(s) 616 may include computer-executable or machine-executable instructions written in any suitable programming language to perform the various functions described. User device(s) 604 may also include geo-location devices (e.g., a global positioning system (GPS) device or the like) for providing and/or recording geographic location information associated with user device(s) 604.

Memory 614 may store program instructions that are loadable and executable on processor(s) 616, as well as data generated during the execution of these programs. Depending on the configuration and type of user device(s) 604, memory 614 may be volatile (such as random access memory (RAM)) and/or non-volatile (such as read-only memory (ROM), flash memory, etc.). User device(s) 604 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 614 may include multiple different types of memory, such as static random access memory (SRAM), dynamic random access memory (DRAM), or ROM.

Turning to the contents of memory 614 in more detail, memory 614 may include an operating system and one or more application programs or services for implementing the features disclosed herein including at least a user provided input element or electronic service web page, such as via browser application 606 or dedicated applications (e.g., smart phone applications, tablet applications, etc.). Browser application 606 may be configured to receive, store and/or display a website or other interface for interacting with service provider computer(s) 610. Additionally, memory 614 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 604.

In some aspects, service provider computer(s) 610 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 610 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 610 may be in communication with user device(s) 604 and/or other service providers via network(s) 608, or via other network connections. Service provider computer(s) 610 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 610 may include at least one memory 618 and one or more processing units (or processor(s)) 620. Processor(s) 620 may be implemented as appropriate in hardware, computer-executable instructions, firmware or combinations thereof. Computer-executable instruction or firmware implementations of processor(s) 620 may include computer-executable or machine-executable instructions written in any suitable programming language to perform the various functions described.

In some instances, hardware processor(s) 620 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 618 may store program instructions that are loadable and executable on processor(s) 620, as well as data generated during the execution of these programs. Depending on the configuration and type of service provider computer(s) 610, memory 618 may be volatile (such as RAM) and/or non-volatile (such as ROM, flash memory, etc.). Service provider computer(s) 610 or servers may also include additional storage 622, which may include removable storage and/or non-removable storage. The additional storage 622 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 618 may include multiple different types of memory, such as SRAM, DRAM, or ROM.

Memory 618, the additional storage 622, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 618 and the additional storage 622 are all examples of computer storage media. Additional types of computer storage media that may be present in service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 610. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 610 may also contain communications connection(s) 624 that allow service provider computer(s) 610 to communicate with a stored database, another computing device or server, user terminals and/or other devices on network(s) 608. Service provider computer(s) 610 may also include I/O device(s) 626, such as a keyboard, a mouse, a pen, a voice input device, a touch input device, a display, speakers, a printer and the like.

Memory 618 may include an operating system 628, one or more data stores 630 and/or one or more application programs or services for implementing the features disclosed herein, including optionally an offload pipeline module 632. The offload pipeline module 632 may be similar to the offload pipeline 212 as described with reference to FIG. 2. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

Figure 7:
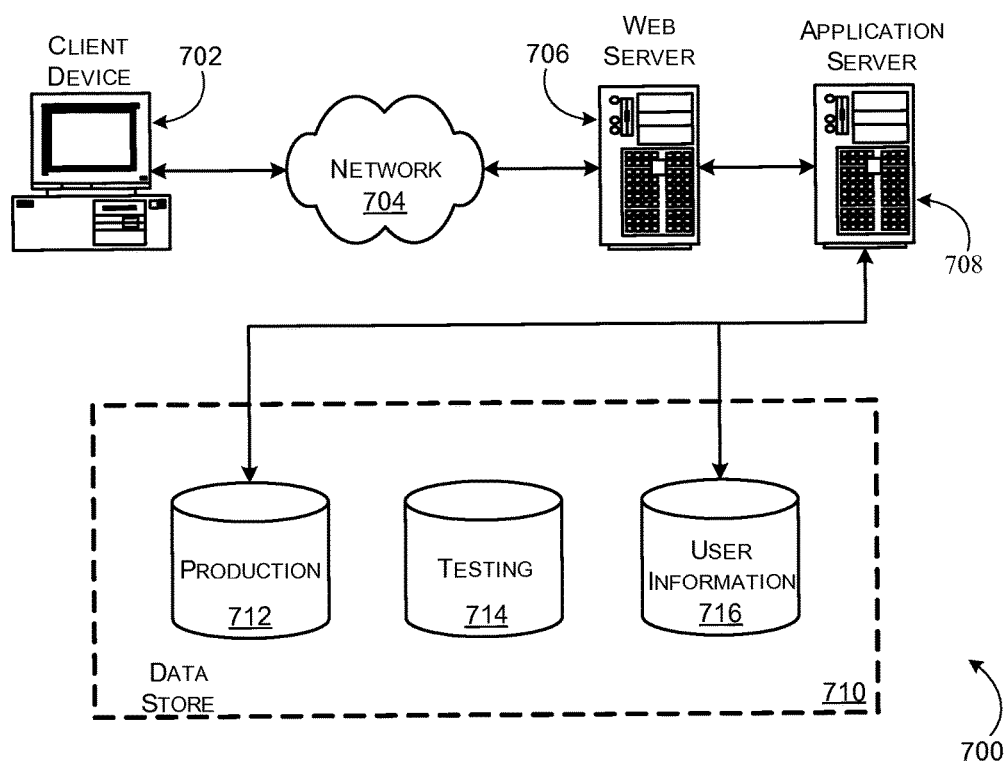
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server computer comprising:
   a host device comprising a host processor, wherein the host processor is configured to execute a plurality of computer-executable instructions; and
   an I/O adapter device communicatively coupled to the host device via a host interface and to a plurality of remote devices via one or more networks, wherein the host device is configured to offload to the I/O adapter device processing of payload data for a transaction for an I/O request received from a first remote device via a first network, wherein the first remote device is a client computer communicatively coupled to the server computer via the first network, the I/O adapter device comprising:
   a processor core, wherein the processor core is configured to execute a plurality of computer-executable instructions;
   an offload pipeline coupled to the processor core; and
   a network interface configured to communicate with the plurality of remote devices via the one or more networks,
   wherein the I/O adapter device is configured to:
   receive the I/O request for the transaction from the client computer via the network interface;
   identify the transaction based on information associated with the I/O request as a type of transaction for processing the payload data for the transaction for storing to a plurality of storage volumes;
   determine, using header information from the I/O request, that the I/O request is for a particular virtual machine from a plurality of virtual machines associated with the host device;
   process the payload data to generate a plurality of processed data based on a configuration of the I/O adapter device, identification that the transaction is the type of transaction for processing the payload data and determination that the I/O request is for the particular virtual machine, wherein the configuration includes a mirroring configuration or a striping configuration; and
   send the plurality of processed data for storing in the plurality of storage volumes.

2. The server computer of claim 1, wherein processing the payload data comprises data mirroring to generate one or more copies of the payload data and wherein the plurality of the processed data includes the one or more copies of the payload data.

3. The server computer of claim 1, wherein processing the payload data comprises data striping to split the data into a plurality of segments and wherein the plurality of the processed data includes two or more segments of the payload data.

4. The server computer of claim 3, wherein processing the payload data further comprises generating one or more error correction codes corresponding to one or more segments of the payload data and wherein the plurality of the processed data includes the one or more error correction codes.

5. The server computer of claim 1, wherein the plurality of remote devices include one or more remote storage devices, wherein at least one of the plurality of the storage volumes reside in the one or more remote storage devices.

6. A server computer comprising:
a host device comprising a host processor, wherein the host processor is configured to execute a plurality of computer-executable instructions; and
an I/O adapter device communicatively coupled to the host device via a host interface and to a plurality of remote devices via one or more networks, wherein the host device is configured to offload to the I/O adapter device processing of payload data for a transaction for an I/O request received from a first remote device, wherein the first remote device is a client computer communicatively coupled to the server computer via a first network, wherein the I/O adapter device is configured to:
receive the I/O request for the transaction from the client computer via the first network;
identify the transaction based on information associated with the I/O request as a type of transaction for processing the payload data for the transaction for storing to at least one of a plurality of storage volumes;
determine, using header information from the I/O request, that the I/O request is for a particular virtual machine from a plurality of virtual machines associated with the host device;
process the payload data to generate a plurality of processed data based on a configuration of the I/O adapter device, identification that the transaction is the type of transaction for processing the payload data and determination that the I/O request is for the particular virtual machine, wherein the configuration includes a mirroring configuration or a striping configuration; and
send the plurality of processed data for storing in the plurality of storage volumes.

7. The server computer of claim 6, wherein the configuration includes the mirroring configuration, the server computer further comprising:
a data mirroring module configured to process the payload data to perform data mirroring for generating one or more copies of the payload data based on the mirroring configuration, wherein the plurality of the processed data includes the one or more copies of the payload data.

8. The server computer of claim 6, wherein the configuration includes the striping configuration, the server computer further comprising:
a data striping module configured to process the payload data to perform data striping for splitting the data in to a plurality of segments based on the striping configuration, and wherein the plurality of the processed data includes two or more segments of the payload data.

9. The server computer of claim 8, further comprising:
an error correction code module configured to generate one or more error correction codes corresponding to one or more segments of the payload data for storing in at least one of the plurality of storage volumes.

10. The server computer of claim 6 coupled to one or more local storage devices, wherein the plurality of the remote devices include one or more remote storage devices, and wherein the plurality of the storage volumes reside in the one or more local storage devices and in the one or more remote storage devices.

11. The server computer of claim 6 coupled to one or more local storage devices, wherein the at least one of the plurality of the storage volumes reside in the one or more local storage devices.

12. The server computer of claim 6, wherein the plurality of the remote devices include one or more remote storage devices, wherein at least one of the plurality of the storage volumes reside in the one or more remote storage devices.

13. The server computer of claim 6, wherein the I/O request for the transaction is received from the virtual machine executing on the client computer.

14. The server computer of claim 6, wherein the information associated with the I/O request includes a type of the I/O request, a type of the first remote device, or protocol specific information.

15. A computer implemented method comprising:
receiving, by a server computer, an I/O request for a transaction from a first remote device from a plurality of remote devices via a network, wherein the first remote device is a client computer communicatively coupled to the server computer via the network, wherein the server computer comprises a host device and an I/O adapter device communicatively coupled to the host device via a host interface, and wherein the host device is configured to offload to the I/O adapter device processing of payload data for the transaction for the I/O request received from the client computer;
identifying the transaction based on information associated with the I/O request as a type of transaction for processing the payload data for the transaction for storing to at least one of a plurality of storage volumes;
determining, using header information from the I/O request, that the I/O request is for a particular virtual machine from a plurality of virtual machines associated with the host device;
processing the payload data to generate a plurality of processed data based on a configuration of the I/O adapter device, identification that the transaction is the type of transaction for processing the payload data and determination that the I/O request is for the particular virtual machine, wherein the configuration includes a mirroring configuration or a striping configuration; and
sending the plurality of processed data for storing in the plurality of storage volumes.

16. The computer implemented method of claim 15, wherein the configuration includes the mirroring configuration, and wherein the processing the payload data comprises data mirroring for generating one or more copies of the payload data based on the mirroring configuration, wherein the plurality of the processed data includes one or more copies of the payload data.

17. The computer implemented method of claim 15, wherein the configuration includes the striping configuration, and wherein the processing the payload data comprises data striping for splitting the data into plurality of segments based on the striping configuration, wherein the plurality of the processed data includes two or more segments of the payload data.

18. The computer implemented method of claim 17 further comprising:
determining that an error correction code flag is enabled for generating one or more error correction codes based on the configuration;
generating the one or more error correction codes corresponding to one or more segments of the payload data; and
sending the one or more error correction codes for storing in one or more storage volumes.

19. The computer implemented method of claim 15, wherein the I/O request for the transaction from the client computer is received by the host device.

20. The computer implemented method of claim 15, wherein the I/O request for the transaction from the client computer is received by the I/O adapter device.

\* \* \* \* \*